July 25, 1967

D. J. VALLEY 3,333,169

ELECTRICAL CAPACITOR WITH A LINEAR
P-XYLYLENE POLYMER DIELECTRIC

Filed May 18, 1966

INVENTOR
DAVID J. VALLEY
BY Leo A. Plum, jr.
ATTORNEY

INVENTOR
DAVID J. VALLEY
BY Leo A. Plum, Jr.
ATTORNEY

United States Patent Office 3,333,169
Patented July 25, 1967

3,333,169
ELECTRICAL CAPACITOR WITH A LINEAR
p-XYLYLENE POLYMER DIELECTRIC
David J. Valley, Greenville, S.C., assignor to Union
Carbide Corporation, a corporation of New York
Filed May 18, 1966, Ser. No. 550,999
8 Claims. (Cl. 317—258)

This invention relates to electrical capacitors and more particularly to an improved capacitor of the type having a dielectric made of paper coated with an organic material.

There are a number of electrical circuit applications which are best suited by paper or plastic-coated paper wound capacitors. AC power applications and other applications involving moderately high voltages and frequencies present electrical stress and temperature problems which many plastic film capacitors cannot meet, or which would require the use of relatively large size units.

Paper and plastic-coated paper wound capacitors, while otherwise suitable for many applications, exhibit a sharply increasing positive temperature co-efficient of dissipation above 50° C. which can induce self-destruction when the capacitors are subject to critical loads.

It is the primary object of this invention to provide a capacitor having an improved plastic-coated dielectric material.

It is another object of this invention to provide an improved wound capacitor particularly suited for relatively high voltage AC applications.

It is a further object of this invention to provide an improved wound capacitor of a relatively smaller unit size than other paper or plastic-coated paper wound capacitors having similar performance characteristics.

Other aims and advantages of this invention will be apparent from the following description, the appended claims and the drawings.

In accordance with the above objects, an improved capacitor is provided, said capacitor formed of a plurality of metal foil electrodes and dielectric spacers interleaved therewith, the dielectric spacer comprising a layer of porous material, for example paper, coated with a uniform, continuous coating of linear p-xylylene polymer. The polymer coating is applied to the porous material by the condensation thereon of reactive p-xylylene diradicals having the general structure:

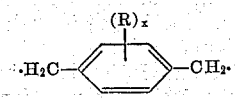

wherein R is an aromatic nuclear substituent group and $x$ is an integer from 0 to 3, inclusive, at temperatures below about 250° C., said diradicals being formed by the pyrolysis of a cyclic di-p-xylylene at temperatures between about 400° C. and 700° C., as more fully set forth hereinafter.

Figure 1:
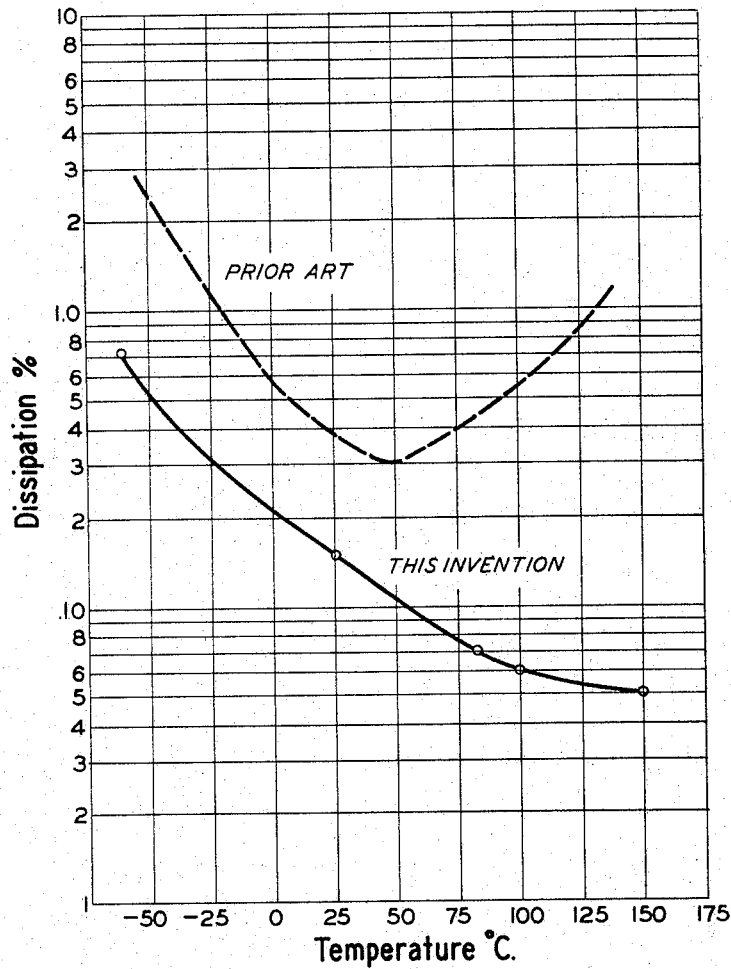
FIG. 1 is a chart showing the performance of the capacitor of this invention compared to a typical prior art capacitor.
Figure 2:
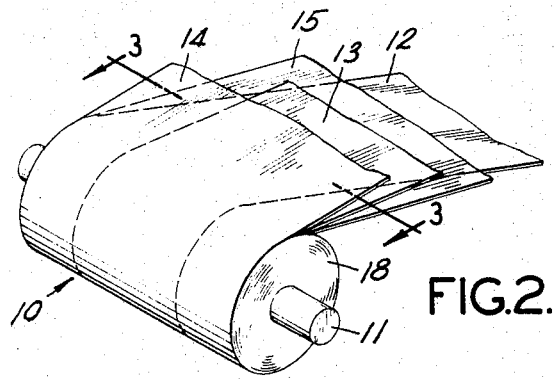
FIG. 2 is a perspective view of a wound capacitor embodiment of this invention, showing the manner and elements of the construction thereof.
Figure 3:
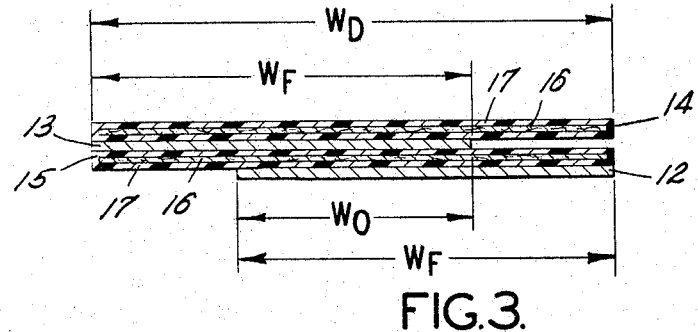
FIG. 3 is a sectional view, taken along line 3—3 of the elements being wound in FIGURE 1, shown enlarged in size.

Referring to FIG. 1, a tubular capacitor 10 is shown being wound on a mandrel 11. Alternate strips 12 and 13 of foil are interleaved with strips 14 and 15 of dielectric material. As seen in FIGS. 2 and 3, the metallic foils 12 and 13 each have a width $W_F$ less than the width $W_D$ of each of the dielectric strips 14 and 15. The edges of the foils 12 and 13 are arranged at opposite edges of the dielectric strips 14 and 15 so that the metal foils overlap in a central portion $W_O$ of the unit thereby providing the effective capacitive area of the unit. The external, non-overlapping portions of the foils are used for the electrical lead wire connection. One terminal wire is connected to the right-hand margin of foil 12 and the other terminal wire is connected to the left-hand margin of foil 13.

Figure 4:
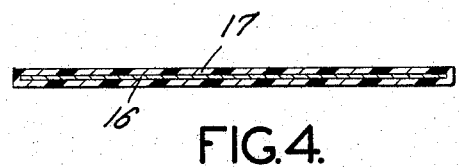
FIG. 4 is a sectional view of the plastic coated dielectric material, enlarged in size.
Figure 5:
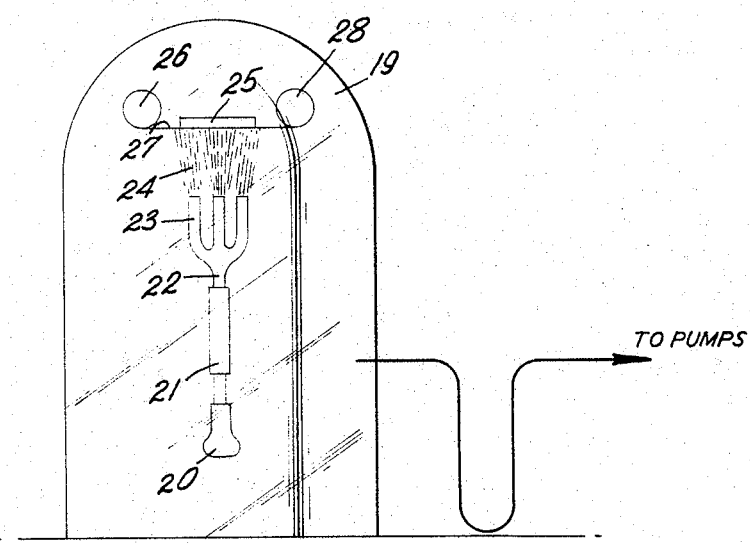
FIG. 5 is a schematic representation of an apparatus useful in producing the plastic coated dielectric utilized in this invention.

The conductive foils 12 and 13 may be aluminum, copper, steel, or any other suitable metal. The dielectric films 14 and 15 as shown in FIG. 3 are formed of a sheet or strip of porous material 16, such as paper, coated with a uniform, continuous coating of linear p-xylylene polymer 17, as shown in FIG. 4.

When wound, the capacitor 10 is removed from the mandrel and an end, such as 18, is prepared for terminal lead wire attachment by having a copper coating flame sprayed thereon to contact the edges of each winding of foil electrode 13. A lead wire (not shown) is soldered to the copper-coated end 18. A similar operation is performed on the other end of the capacitor roll. The unit is then encapsulated by any of the conventional methods, such as hot dipping, resin dipping, plastic dipping, potting in a molded container, etc.

The above described wound capacitor of an extended foil type is set forth only as an example of an embodiment of this invention. Many other types of wound capacitors, such as inserted tab capacitors, can also be made using the teachings of this invention. In addition, it is to be understood that other forms of capacitors than wound capacitors may be formed, for example, stacked or flat capacitors, using the principles of this invention.

The porous material used in the dielectric can be a cellulosic material such as paper. Kraft papers are preferred, but other papers such as beneres paper, made from hemp, can also be used.

The paper strip can be coated with the linear p-xylylene polymer using an apparatus of the type shown in FIG. 4 wherein an evacuated bell jar 19 encloses a vapor generator. The vapor generator comprises broadly a container 20 which holds the organic material to be vaporized, a p-xylylene cyclic dimer. The container 20 is provided with heating means (not shown) to vaporize this material which then passes into a vapor tube 21. The vaporized p-xylylene cyclic dimer is further heated in this tube (by heating means surrounding the tube, not shown) to pyrolyze the vapor to form p-xylylene diradicals. A discharge means 22 having at least one discharge tube 23 is arranged to discharge a stream 24 of these p-xylylene diradicals at a support 25. A roll of paper 26 can be arranged to continuously unroll a strip of paper 27 under the support 25 and onto another roll 28. The p-xylylene diradicals condense on the strip of paper to form a uniform, continuous coating of linear p-xylylene polymer. The strip can be turned and reprocessed to coat the other side of the paper.

The above-described apparatus is only illustrative of a means for coating paper with the polymer. Other types of apparatus and procedures could be used, for example, the generator could be located outside of the bell jar with only the discharge tube 23 projecting thereinto, or the apparatus might be arranged to coat both sides of the paper strip simultaneously.

The capacitor of this invention having a dielectric formed of paper with a uniform, continuous coating of linear p-xylylene polymer thereon has superior electrical properties. This capacitor has a relatively high capacitance; and, when compared to paper and other plastic-coated paper capacitors, the capacitor of this invention shows a higher insulation resistance, lower dissipation, a lower temperature coefficient of capacitance and higher dielectric strength. A particularly important feature of the capacitor of this invention is that it has a negative temperature coefficient of dissipation which permits a higher loading.

The dissipation of the capacitor of this invention is from about 0.1 to about 0.25 percent and decreases with temperature to about 0.05 percent to 150° C. The insulation resistance typically ranges from about 70,000 meg. Ω-microfarad at 25° C. to 2,000 Ω-microfarad at 125° C. Capacitance change is about 5 percent from room temperature to −65° C. and 150° C. The breakdown voltage ranges from 250 to 600 volts D.C.

These properties and the others following are typical of a wound capacitor constructed according to this invention as follows: kraft capacitor tissue, 0.00025 inch thick (about 6 microns) was coated on each side with a uniform, continuous 2 micron thick coating of linear p-xylylene polymer as described previously. Aluminum foils, 0.00025 inch thick were used for the electrodes.

The coating was smooth and continuous externally and intimately enveloped the fibrous paper structure to the extent that the plasic film and paper could not be separated. The p-xylylene appears to penetrate the interstices of the paper giving each fiber a coating. The coating appears to be non-bridging. A number of capacitors were wound using the above-described materials. These capacitors were not wound on precision winding machines with the result that some variations or ranges of performance characteristics resulted. However, the values given herein are typical of the properties of capacitors of this invention. The capacitance of the devices tested ranged from 0.007 microfarad to 0.054 microfarad as a result of variations in the number of turns and amount of overlap. The dissipation was consistently in the range from 0.1 to 0.25 percent at 25° C. and 1000 c.p.s. This is several times lower than the dissipation of other paper and plastic-coated paper capacitors. It is generally considered that a dissipation of less than 1 percent at 25° C. and 1000 c.p.s. is highly satisfactory.

Temperature cycling tests were conducted using several test methods and temperature cycles as set forth in Table 1.

TABLE 1.—TEMPERATURE CYCLING AND TESTS PERFORMED

| TCC Test | IR Test | TCD Test |
| --- | --- | --- |
| 1. 25° C. | 7. 50° C. | 11. −65° C. |
| 2. −65° C. | 8. 100° C. | 12. 85° C. |
| 3. 85° C. | 9. 125° C. | 13. 100° C. |
| 4. 100° C. | 10. 25° C. | 14. 150° C. |
| 5. 150° C. | | 15. 25° C. |
| 6. 25° C. | | |

The TCC test involves maintaining the specimen in a test chamber at a desired temperature and measuring the capacitance with a suitable bridge after equilibrium conditions are reached.

The IR test involves maintaining the specimen in a test chamber at a desired temperature and measuring the leakage current at a constant voltage after equilibrium conditions are reached.

The TCD test involves maintaining the specimen in a test chamber at a desired temperature and measuring the dissipation factor with a suitable bridge after equilibrium conditions are reached.

The results of the tests as set forth in Table 2.

TABLE 2.—CAPACITANCE AND DISSIPATION MEASUREMENTS

| Test Number | Initial capacitance, microfarads | Initial dissipation, percent | Final capacitance, microfarads | Final dissipation, percent |
| --- | --- | --- | --- | --- |
| 1 | .0225 | .09 | .0228 | .11 |
| 2 | .0208 | .11 | .0208 | .13 |
| 3 | .0220 | .12 | .0220 | .13 |
| 4 | .0430 | .19 | .0427 | .22 |
| 5 | .0190 | .10 | .0192 | .16 |
| 6 | .0200 | .10 | .0200 | .11 |
| 7 | .0544 | .20 | .0543 | .25 |
| 8 | .0129 | .14 | .0132 | .15 |
| 9 | .0264 | .11 | .0264 | .12 |
| 10 | .0145 | .11 | .0146 | .15 |
| 11 | .0073 | .12 | .0074 | .13 |
| 12 | .0201 | .14 | .0202 | .16 |
| 13 | .0445 | .18 | .0440 | .20 |

The capacitance change after temperature cycling averaged less than 1 percent with a maximum change of about 2 percent. There was a slight increase in dissipation as a result of the temperature cycling.

The temperature coefficient of capacitance is positive over the range from −65° C. to 150° C. and has an average of 450 at −65° C., 250 at 85° C., 270 at 100° C., and 400 at 150° C., expressed in p.p.m. per degree C. Table 3 shows this temperature change in percents at the various temperatures.

TABLE 3.—TEMPERATURE CHANGE IN CAPACITANCE-PPXP

| Test Number | Percent change in capacitance | | | |
| --- | --- | --- | --- | --- |
| | −65° C. | 85° C. | 100° C. | 150° C. |
| 1 | 3 | 1.5 | 2 | 4 |
| 2 | 3 | 1.0 | 1.5 | 4 |
| 3 | 3 | 1.5 | 2 | 4 |
| 4 | 4.5 | 3 | 3 | 9 |
| 5 | 3.5 | 1.5 | 2 | 5 |
| 6 | 3 | 1.5 | 1.5 | 3 |
| 7 | 6 | 4 | 4 | 9 |
| 8 | 4 | 1 | 1 | 6 |
| 9 | 3 | 1.5 | 2 | 3 |
| 10 | 2 | 1 | 1 | 4 |
| 11 | 2 | 1 | 1.5 | 1.5 |
| 12 | 4 | 1 | 1.5 | 3 |
| 13 | 7 | 3 | 4 | 8 |
| Avg | 4 | 1.5 | 2 | 5 |

The variation in results shown in Table 3 are due to the differences in numbers of turns for the various capacitor samples tested, as well as differences in amount of overlap.

As stated previously, an important feature of the capacitor of this invention is that it exhibits a marked decrease in dissipation with increasing temperature over a wide temperature range. In Table 4 there is shown the variation in percent dissipation with increasing temperature for several wound capacitors, as follows (1) the linear p-xylylene polymer coated paper capacitor of this invention; (2) a kraft paper capacitor; and (3) a paper-plastic capacitor (a dual dielectric of paper and a polyester film).

TABLE 4.—PERCENT DISSIPATION WITH INCREASING TEMPERATURE

| Temperatures, °C | −55 | 25 | 50 | 75 | 100 | 125 |
| --- | --- | --- | --- | --- | --- | --- |
| Type capacitor: | | | | | | |
| (1) Linear p-xylylene paper | 0.6 | .15 | .10 | .08 | .06 | .055 |
| (2) Paper | 2.0 | .35 | .30 | .25 | .20 | .1 |
| (3) Paper-plastic | 2.0 | .30 | .25 | .30 | .42 | .755 |

As seen above, the linear p-xylylene-paper capacitor of this invention has low dissipation and a negative temperature coefficient of dissipation. The paper and paper-plastic capacitors, however, have higher dissipations and exhibit a rising positive temperature coefficient of dissipation above 50° C. which can induce self-destruction when the capacitors are subjected to critical AC loads. An AC power drop across a paper or other plastic-paper capacitors causes heating which increases losses, which in turn cause more heating. This progressive build-up in temperature continues until failure. To overcome this deficiency in paper and most plastic-paper capacitors, they must be operated well below their critical loads which means they must be greater in size than a more ideal capacitor. A linear p-xylylene-paper capacitor subjected to the same critical load has a self-limiting characteristic in that, as the temperature rises due to AC power drop, the loss factor decreases, reducing the heating effect and allowing the capacitor to reach equilibrium at some moderate temperature. While some paper capacitors do have a negative temperature coefficient of dissipation, they are generally several times greater than that of the linear p-xylylene-paper capacitors of this invention with the result that such paper capacitors could be operated at only lower critical loads.

The chart of FIG. 1 shows the temperature change of dissipation for the linear p-xylylene-paper capacitor of this invention and that of a typical prior art capacitor having a polyester film-paper dielectric.

The linear p-xylylene-paper capacitor has a high insulation resistance, particularly at elevated temperatures, about 2000 Ω-microfarad at 125° C. This is about ten times higher than the resistance of paper, polyester film-paper, or polyester film capacitors. High insulation resistance is desirable for AC applications, and is especially important for AC–DC applications were the AC losses (a function of dissipation) and the DC losses (a function of insulation resistance) may in combination exceed the critical load.

The linear p-xylylene-paper capacitor has a dielectric strength in excess of 10,000 volts per mil (DC). Table 5 compares the DC breakdown voltage of three capacitors each having a dielectric thickness of 10 microns, as follows: (1) a capacitor of this invention having with paper 6 micron thick and a 2 micron thick coating on each side of linear-p-xylylene polymer; (2) kraft paper capacitor; (3) impregnated paper capacitor.

TABLE 5.—DC BREAKDOWN VOLTAGE

| Type capacitor: | Volts |
| --- | --- |
| (1) Linear p-xylylene paper | 4000 |
| (2) Paper | 500 |
| (3) Impregnated paper | 1500 |

The linear p-xylylene-paper capacitor has desirable dielectric absorption properties. This property denotes the effectiveness with which a capacitor drains its charge when shorted, and ideally this should be total and instantaneous. Table 6 shows the superior properties of the capacitor of this invention along with those of other capacitors.

TABLE 6.—DIELECTRIC ABSORPTION

| Type capacitor: | Percent dielectric absorption |
| --- | --- |
| (1) Linear p-xylylene paper | 0.2 |
| (2) Paper | 0.6–3 |
| (3) Paper-polyester film | 0.9 |
| (4) Polyester film | 0.5 |

A review of the preceding properties and tables shows that the linear p-xylylene-paper capacitors of this invention are superior to most paper and plastic-paper capacitors in many regards. The linear p-xylylene paper capacitor has particular advantages in regard to AC power applications where there are stringent requirements on dielectric performance. This is due to the passage of relatively large currents (compared to DC leakage currents) through the dielectric producing heat with accompanying increases in losses and decreases in resistance. These effects generally increase with increasing frequency. The linear p-xylylene-paper capacitor is excellently suited for use at AC power frequencies (60 to 400 c.p.s.) and can also be used at higher frequencies, such as the radio frequency range.

The superior electrical properties of the capacitor depend on the existence of a uniform, continuous coating of linear p-xylylene on the porous material. It is particularly important that the coating be a truly linear p-xylylene polymer, free of cross-linking and free of other low molecular weight components. Unsuccessful attempts have been made to applying coatings of poly-p-xylylene as a linear polymer. One such attempt coated fabrics with a polymer formed by pyrolyzing p-xylene at 900° C. to 1000° C. causing molecular breakdown of only a small amount of the p-xylene into p-xylylene diradicals along with other polyfunctional radicals. These radicals were then condensed on fabrics forming a polymeric coating of a wide range of molecular weights and a mixture of other minerals including a large amount of unreacted p-xylene, the result being a substantially cross-linked polymer mixed with about 20 percent by weight of relatively low molecular weight material.

It is essential for the attainment of superior electrical properties in the capacitor of this invention that the coating on the porous material be uniform, continuous, truly linear p-xylylene polymer. By uniform is meant that the coating is of substantially the same thickness over the whole of the surface coated. By continuous is meant that the coating be free of pin holes or other discontinuities which might cause short circuiting from one electrode to another. By truly linear p-xylylene polymer is meant a polymer coating consisting only of p-xylylene polymer substantially free of cross-linking and other low molecular weight components. Such a coating is achieved by the condensation on the paper or other porous material of only reactive p-xylylene diradicals. By following the process steps heretofore outlined, a stream consisting only of such reactive p-xylylene diradicals can be supplied. The superior electrical properties described for the capacitor of this invention cannot be achieved unless a uniform, continuous coating of truly linear p-xylylene polymer is formed.

It has been found that a truly linear polymeric coating can be obtained by condensing the reactive diradicals obtained by pyrolysis of the cyclic dimer di-p-xylylene represented by the formula:

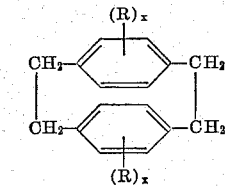

wherein R is the same or a different substituent group on either aromatic ring and $x$ is an integer from 0 to 3.

The substituent groups R which could be substituted on the dimer are any organic or inorganic group which can normally be substituted on aromatic nuclei. Illustrations of such substituent groups are alkyl, aryl, alkenyl, amino, cyano, carboxyl, alkoxy, hydroxy alkyl, carbalkoxy, and like radicals as well as inorganic radicals such as hydroxyl, nitro, halogen, and other similar groups which are normally substitutable on aromatic nuclei; and additionally those simple hydrocarbon groups such as the lower alkyls methyl, ethyl, propyl, butyl, hexyl; the halogen groups, particularly, fluorine, chlorine, bromine, and iodine and also, the cyano groups. It is of course understood that where no R substituent groups are present, that site will be occupied by hydrogen.

Inasmuch as the coupling and polymerization of the reactive diradicals upon the condensation of the diradicals does not involve the aromatic ring, any unsubstituted or desired substituted p-xylylene polymer can be prepared since the substituent groups function essentially as inert groups.

However, since the polymer serves here as a dielectric medium and many of the above substituted p-xylylene polymers will have a noticeable or appreciable dipole moment, they do not all provide equal and equivalent results in capacitors. The dissipation factor of certain of the p-xylene polymers having highly polar substituent groups may be higher than that which can be tolerated for certain specific end uses. However for other uses, high dissipation factor may not be objectionable or could possibly be a desired function of the specific capacitor, since these substituted p-xylylene polymers often have a higher dielectric constant than does the unsubstituted polymer.

Furthermore, it may also be evident that certain physical attributes of a specific substituted p-xylylene polymer may be so desirable that the dielectric properties may be acceptable or tolerated. Poly(2-chloro-p-xylylene), for example, is a very tough polymer having certain mechanical benefits over other p-xylylene polymers. Also, poly($\alpha,\alpha,\alpha',\alpha'$ tetra fluoro-p-xylylene) is highly temperature resistant and can even tolerate exposure of 300° C. for 100 hours without any change in physical strength. Of the substituted p-xylylene polymers these two are preferred. Normally however, for most general applications, the unsubstituted p-xylylene diradical is preferred for use in the present invention, i.e., where $x$ is 0 and all substituents are hydrogen, as the polymer made from it possesses the most stable electrical properties and the most desirable dielectric constant and power factor of all these polymers.

Therefore, for the purposes of this invention the terms "di-p-xylylene" and "p-xylylene diradical" mean broadly the unsubstituted dimer or diradical, respectively, or any substituted dimer or diradical which leads to the production of a substituted or unsubstituted p-xylylene polymer having, when coated on paper or other porous material, that combination of electrical and physical properties, including in some cases a resistance to high temperatures, effective to produce a superior capacitor dielectric.

The cyclic dimer, di-p-xylylene, and the substituted dimers used in this process are known in the art. The substituted dimers can be prepared from di-p-xylylene by appropriate treatment for the introduction of substituent groups. The substitution reactions are preferably conducted at low temperature due to the possibility of cleavage or rearrangement of the di-p-xylylene by strong acids at elevated temperatures. Di-p-xylylene readily enters into free radical, base catalyzed, or acid catalyzed slightly elevated temperature reactions. Thus halogenation, alkylation, acetylation, nitration, amination, cyanation, and like methods for the introduction of such substituent groups as can normally be substituted on aromatic nuclei are applicable.

The cyclic dimer (I) is pyrolyzed to produce the reactive diradicals shown below (II). Preferably the cyclic dimer is first vaporized at low temperatures before pyrolysis. Vaporization of the di-p-xylylene commences at temperatures above at least about 100° C. The primary step of vaporization rather than direct pyrolysis is used to prevent local overheating and degradation of the dimer and also to insure a more efficient pyrolysis. However, the vaporization is not critically necessary for operation of this process.

The pyrolysis of the vaporous di-p-xylylene occurs at temperatures exceeding about 400° C., and most advantageously, at temperatures between about 550° C. and 700° C. Said pyrolysis results in the quantitative cleavage of the di-p-xylylene (I) and the formation of the reactive diradicals of the structure

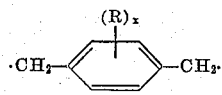

wherein $(R)_x$ represents the aromatic nuclear substituents as defined in structure (I). The pyrolytic cleavage does not result in any change in the aromatic portions of the di-p-xylylene precursor (I), and no other low molecular weight entities are present in the pyrolysis vapors.

Regardless of the pressure employed, pyrolysis of the starting di-p-xylylenes begins at about 400° C. as pyrolysis does not appear to be a function of the operating pressure. At temperatures above about 700° C., cleavage of the substituent groups can occur, resulting in a tri- or poly-functional species causing cross-linking or highly branched polymers.

While pyrolysis temperature is substantially independent of the operating pressure, it is preferred that reduced or sub-atmospheric pressures be employed. For most operations, system pressures within the range of about 0.0001 to 10 mm. Hg are most practical. However, if desired, greater pressures can be employed by using inert non-organic, vaporous diluents such as nitrogen, argon, carbon dioxide, steam and the like which can either vary the optimum temperature of operation or change the total effective pressure in the system. In fact essentially quantitative yields of clear, tough linear poly-p-xylylene is secured at system pressures up to atmospheric as long as the diradical partial pressure is maintained below 1.0 mm. pressure.

Polymer quality is dependent on diradical partial pressure in the condensation zone. Deposition at or above 1.0 mm. partial pressure has been found to yield yellow, highly fluorescent polymers with impaired physical properties containing stilbene moieties and/or substantial cross-linking. As the partial pressure is reduced below 1.0 mm., polymer quality as measured by color, transparency and fluorescence is remarkably improved. At a pressure of 0.75 mm. the polymer is free of fluorescence and acceptable in quality although slightly yellow whereas at a pressure of 0.5 mm. or less the quality is excellent with no color or fluorescence, and is strong and flexible. Preferably the diradical partial pressure should be from 0.001 to about 0.5 mm.

The diradicals formed in the manner described above impinge upon the surface of the paper or other porous material, said surface being maintained at temperatures below the condensation temperature of the diradicals, and upon condensing thereon, spontaneously polymerize to form a uniform continuous coating of a truly linear p-xylylene polymer having the general structure:

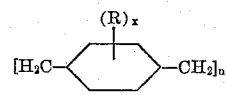

wherein R and $x$ are as defined above and $n$ is the number of repeating units in the chain, typically above 5,000.

It has been observed that for each diradical species, there is a definite ceiling condensation temperature above which the diradical will not condense and polymerize. All observed ceilings of p-xylylene diradicals have been below about 250° C. but vary to some degree upon the operating pressure employed. For example, at 0.5 mm. Hg pressure, typical condensation and polymerization temperatures observed for the following diradicals are:

|   | ° C. |
|---|---|
| p-Xylylene | 25–30 |
| Chloro-p-xylylene | 70–80 |
| Dichloro-p-xylylene | 200–250 |

Depending on the substituents present on the cyclic dimer either homopolymers or copolymers can be formed. For example, when $(R)_x$ is the same, in each instance in the recurring units, homopolymers are formed upon condensation of the diradicals. When either R or $x$ are different in the recurring units or a mixture of cyclic dimers are pyrolyzed, copolymers can be formed by maintaining the condensation temperature below the lowest ceiling condensation temperature of the substituted diradicals formed. Thus, it is seen that the condensation-polymerization operation does not affect the aromatic portion of the diradical (II), nor does it affect the substituent groups. As shown previously, only those R groups which lead to the production of a superior dielectric are meant to be used.

p-Xylylene polymers have unusually good resistance to practically all solvents, and this is an indication of the freedom of the polymer coating of other low molecular weight components.

In accordance with the preferred mode for performing the coating operation, a measured quantity of the appropriate di-p-xylylene is placed within the container 20 (vaporization zone) of the vapor generator (vaporization-pyrolyzation furnace). The system is evacuated to the aforementioned pressure level and the di-p-xylylene is then passed into the vapor tube 21 (pyrolysis zone). The pyrolysis zone should be long enough to provide for a residence time of about .001 to 1 second, or at least sufficient time to pyrolyze all the di-p-xylylene to the reactive diradical. The diradicals formed in the pyrolysis zone are passed through the discharge nozzle 23 toward the support 25 where the diradicals contact the paper 26 or other porous material and condense on the surfaces of said articles thus forming a polymeric film of the p-xylylene polymer. The surface of the paper is kept at the proper temperature for condensation by cooling means associated with the support 25 (not shown).

The thickness of the polymeric coating can be controlled by duration of the exposure of the strip of paper. In a previous example a coating 2 microns thick was produced on each side of a 6 micron-thick paper strip. This coating could be increased in thickness up to 1 mil or more.

The preferred p-xylylene polymers for coating paper or other porous materials to produce superior dielectric materials are p-xylylene (unsubstituted), 2-chloro-p-xylylene, and $\alpha, \alpha, \alpha', \alpha'$ tetra fluoro-p-xylylene. The temperature resistance and dielectric constant of free films of these materials are shown in Table 7 for comparison.

TABLE 7.—PREFERRED p-XYLYLENE POLYMERS

| Polymer | Maximum Operating Temperature, °C. | Dielectric Constant |
|---|---|---|
| (1) p-xylylene (unsubstituted) | >175 | 2.7 |
| (2) 2-chloro-p-xylylene | >175 | 3.0 |
| (3) $\alpha, \alpha, \alpha', \alpha'$ Tetra fluoro-p-xylylene | >300 | 2.6 |

When coated on paper, the maximum operating temperature and dielectric constant will differ from the values given above, but nevertheless superior dielectrics will result.

What is claimed is:
1. An improved wound capacitor comprising a roll of wound metal foil electrodes and dielectric spacers interleaved therewith, the dielectric spacer comprising a layer of porous material coated with a uniform, continuous coating of linear p-xylylene polymer.
2. The wound capacitor of claim 1 in which the porous material is paper.
3. The wound capacitor of claim 2 in which the coating is a linear polymer of p-xylylene.
4. The wound capacitor of claim 2 in which the coating is a linear polymer of 2-chloro-p-xylylene.
5. The wound capacitor of claim 2 in which the coating is a linear polymer of $\alpha, \alpha, \alpha', \alpha'$, tetra fluoro-p-xylylene.
6. The wound capacitor of claim 2 in which the coating is applied to the porous material by the condensation thereon of reactive p-xylylene diradicals havings the structure

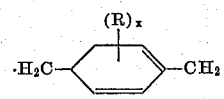

wherein R is a substituent group and $x$ is an integer from 0 to 3, inclusive, at temperatures below the condensation temperature of the diradical.
7. The wound capacitor of claim 3 in which the reactive p-xylylene diradicals are formed by the pyrolysis of a cyclic di-p-xylylene at temperatures between about 550° and 700° C. and at diradical partial pressures between about 0.001 to 0.5 mm. Hg.
8. An improved capacitor comprising a plurality of stacked metal foil electrodes and dielectric spacers interleaved therewith, the dielectric spacer comprising a layer of porous material coated with a uniform, continuous coating of linear p-xylylene polymer.

References Cited

UNITED STATES PATENTS 2,785,090   3/1957   Kirk
3,202,892   8/1965   Metherwood _____ 317—258

LEWIS H. MYERS, *Primary Examiner.*

E. GOLDBERG, *Assistant Examiner.*